United States Patent [19]

Biber et al.

[11] Patent Number: 4,951,278
[45] Date of Patent: Aug. 21, 1990

[54] HIGH-LEVEL DATA LINK CONTROL PACKET ASSEMBLER/DISASSEMBLER

[75] Inventors: Jeffrey Biber, Sterling, Va.; Jeffrey Cohen, Silver Spring, Md.; John Holmbald, Oakton, Va.; Zon-Hong Hsieh, Potomac; Douglas Kay, Chevy Case, both of Md.; Roy Spitzer, Vienna, Va.

[73] Assignee: Telenet Communications Corporation, Reston, Va.

[21] Appl. No.: 238,581

[22] Filed: Aug. 31, 1988

[51] Int. Cl.⁵ .......................................... H04L 11/00
[52] U.S. Cl. .................................... 370/60; 370/94.1
[58] Field of Search ............................. 370/60, 94, 58

[56] References Cited

U.S. PATENT DOCUMENTS 4,058,672  11/1977  Crager et al. ......................... 370/94

FOREIGN PATENT DOCUMENTS 0234191  9/1987  European Pat. Off. ............. 370/60
0014553  1/1985  Japan .................................... 370/60
0149239  7/1987  Japan .................................... 370/60
0293850  12/1987  Japan .................................... 370/60

OTHER PUBLICATIONS

Lars-Erik Lögdberg, Eripax, a Data Communication System, Ericsson Review No. 2, 1983.

Primary Examiner—Douglas W. Olms
Assistant Examiner—Alpus H. Hsu
Attorney, Agent, or Firm—Leitner, Greene & Christensen

[57] ABSTRACT

A data communications system has a layered communication architecture including network services protocols including a link layer and higher level protocols, and has IBM or IBM-compatible synchronous data link control (SDLC) devices including a host computer and a plurality of end user devices desiring to communicate across an X.25 packet-switching network (PSN) of the communications system. A packet assembler/disassembler (PAD) support X.25 communication across the PSN between the SDLC-utilizing host computer and the SDLC-utilizing end user device. In one embodiment, separate high level data link control (HDLC) PADs are provided at each end of the PSN operationally associated with the host computer and the plurality of end user devices, respectively. The PADS generate and respond to at least three formats of SDLC commands and responses, and, in association with their respective SDLC devices, perform at least four functions including a call setup phase, a data transfer phase, a call clearing phase, and handling of abnormal conditions. PAD means comprises qualified logical link control (QLLC) PAD means located at an end of said packet switching network for either operational association with said host computer or operational association with said plurality of end user devices. In another embodiment, a single qualified logical link control (QLLC) PAD performs functions similar to those of the HDLC PAD embodiment, except that rather than having a PAD at both ends (host end and terminal end) of a connection, a PAD is provided at only one end of the connection.

6 Claims, 21 Drawing Sheets

| (Octet) | MS Bit 8 | 7 | 6 | Poll/Final Bit 5 | 4 | 3 | 2 | LS Bit 1 |
|---|---|---|---|---|---|---|---|---|
| 1 | \multicolumn{8}{c}{Address Field} |
| 1 | a | a | a | a | a | a | a | a |
| 2 | \multicolumn{8}{c}{Control Field} |
| 2 | 1 | 0 | 0 | 1 | 0 | 0 | 1 | 1 |
| 3 | f | f | f | f | f | f | f | f |
| 4 | \multicolumn{8}{c}{Frame Check Sequence} |
| 4 | f | f | f | f | f | f | f | f |

FIG. 5

| (Octet) | MS Bit 8 | 7 | 6 | Poll/Final Bit 5 | 4 | 3 | 2 | LS Bit 1 |
|---|---|---|---|---|---|---|---|---|
| 1 | \multicolumn{8}{c}{Address Field} |
| 1 | a | a | a | a | a | a | a | a |
| 2 | \multicolumn{8}{c}{Control Field} |
| 2 | 0 | 1 | 1 | 1 | 0 | 0 | 1 | 1 |
| 3 | f | f | f | f | f | f | f | f |
| 4 | \multicolumn{8}{c}{Frame Check Sequence} |
| 4 | f | f | f | f | f | f | f | f |

FIG. 6

**Address and Facility data is optional in Call Accepted/Call Connected packets. Address lengths of zero must be specified when address information is absent but facility information is present.

| (Octet) | MS Bit 8 | 7 | 6 | Poll/Final Bit 5 | 4 | 3 | 2 | LS Bit 1 |
|---|---|---|---|---|---|---|---|---|
| 1 | \multicolumn{8}{c|}{Address Field} | | | | | | | |
| 1 | a | a | a | a | a | a | a | a |
| 2 | \multicolumn{8}{c|}{Control Field} | | | | | | | |
| 2 | \multicolumn{3}{c|}{Nr} | P/F | 0 | 0 | 0 | 1 |
| 3 | f | f | f | f | f | f | f | f |
| | \multicolumn{8}{c|}{Frame Check Sequence} | | | | | | | |
| 4 | f | f | f | f | f | f | f | f |

FIG. 12

| (Octet) | MS Bit 8 | 7 | 6 | Poll/Final Bit 5 | 4 | 3 | 2 | LS Bit 1 |
|---|---|---|---|---|---|---|---|---|
| 1 | \multicolumn{8}{c|}{Address Field} | | | | | | | |
| 1 | a | a | a | a | a | a | a | a |
| 2 | \multicolumn{8}{c|}{Control Field} | | | | | | | |
| 2 | 0 | 1 | 0 | 1 | 0 | 0 | 1 | 1 |
| 3 | f | f | f | f | f | f | f | f |
| | \multicolumn{8}{c|}{Frame Check Sequence} | | | | | | | |
| 4 | f | f | f | f | f | f | f | f |

FIG. 14

| (Octet) | MS Bit 8 | 7 | 6 | Poll/Final Bit 5 | 4 | 3 | 2 | LS Bit 1 |
|---|---|---|---|---|---|---|---|---|
| 1 | \multicolumn{8}{c}{Address Field} | | | | | | | |
| | a | a | a | a | a | a | a | a |
| 2 | \multicolumn{8}{c}{Control Field} | | | | | | | |
| | 0 | 1 | 0 | 1 | 0 | 0 | 1 | 1 |
| 3 | f | f | f | f | f | f | f | f |
| 4 | \multicolumn{8}{c}{Frame Check Sequence} | | | | | | | |
| | f | f | f | f | f | f | f | f |

FIG. 18

| (Octet) | MS Bit 8 | 7 | 6 | Poll/Final Bit 5 | 4 | 3 | 2 | LS Bit 1 |
|---|---|---|---|---|---|---|---|---|
| 1 | \multicolumn{8}{c}{Address Field} | | | | | | | |
| | a | a | a | a | a | a | a | a |
| 2 | \multicolumn{8}{c}{Control Field} | | | | | | | |
| | 0 | 0 | 0 | 1 | 1 | 1 | 1 | 1 |
| 3 | f | f | f | f | f | f | f | f |
| 4 | \multicolumn{8}{c}{Frame Check Sequence} | | | | | | | |
| | f | f | f | f | f | f | f | f |

FIG. 20

HIGH-LEVEL DATA LINK CONTROL PACKET ASSEMBLER/DISASSEMBLER

BACKGROUND OF THE INVENTION

1. Field of the Invention

The present invention relates generally to packet switching networks, and more particularly to a set of software modules for a specialized packet assembler/disassembler (PAD) that allows IBM or IBM-compatible synchronous data link control (SDLC) devices to communicate across an X.25 packet-switching network.

2. Prior Art

In packet-switched networks, packets in the form of units of data are transmitted from a source—such as a user terminal, computer, application program within a computer, or other data handling or data communication device—to a destination, which may be simply another data handling or data communication device of the same character. The devices themselves typically are referred to as users, in the context of the network. Blocks or frames of data are transmitted over a link along a path between nodes of the network. Each block consists of a packet together with control information in the form of a header and a trailer which are added to the packet as it exits the respective node. The header typically contains, in addition to the destination address field, a number of subfields such as operation code, source address, sequence number, and length code. The trailer is typically a technique for generating redundancy checks, such as a cyclic redundancy code for detecting errors. At the other end of the link, the receiving node strips off the control information, performs the required synchronization and error detection, and reinserts the control information onto the departing packet.

Packet switching arose, in part, to fulfill the need for low cost data communications in networks developed to allow access to host computers. Special purpose computers designated as communication processors have been developed to offload the communication handling tasks which were formerly required of the host. The communication processor is adapted to interface with the host and to route packets along the network; consequently, such a processor is often simply called a packet switch.

Packet-switched data transmission may be accomplished via predetermined end-to-end paths through the network, in which user packets associated with a great number of users share link and switch facilities as the packets travel over the network. Accordingly, the packets require storage at nodes between transmission links of the network until they may be forwarded along the respective outgoing link for the overall path. This type of data transmission is generally referred to as virtual circuit or connection-oriented transmission.

Another mode of packet-switched data transmission requires no initial connection for a data path through the network, and, hence, is termed connectionless transmission. In this mode, individual datagrams carrying a destination address are routed through the network from source to destination via intermediate nodes, and do not necessarily arrive in the order in which they were transmitted.

By way of example, in the widely-used initial Telenet public packet-switched network the routing of data is accomplished using a two-level hierarchy. The hierarchy comprises a long distance-spanning backbone network with a multiplicity of nodes or hubs, each of which utilizes a cluster of backbone switches: and smaller geographic area networks with backbone trunks, access lines and clustered lower level switches connected to each hub. Packet-switched data transmission through the network is accomplished by means of the virtual circuit connection-oriented mode using CCITT (International Telegraph and Telephone Consultative Committee of the International Telecommunications Union) X.75 protocol, which is a compatible enhancement of X.25 protocol.

Prospective routing paths in the network are initially determined by a network control center, which then transmits these predetermined paths to the backbone switches as routing tables consisting of primary and secondary choices of available links from each hub. The secondary choices are viable only in the event of primary link failures, and the specific secondary link selection is a local decision at the respective hub based principally on current or recent traffic congestion patterns. The unavailability of an outgoing link from a hub at the time of the call setup effects a clearing back of the predetermined virtual circuit for the sought call to the preceding hub. An alternative link is then selected by that hub, or, if none is available there, the virtual circuit is again cleared back to the next preceding hub, and so forth, until an available path is uncovered from the routing tables. Messages concerning link and/or hub failures are communicated immediately to the network control center, and that information is dispatched to the rest of the network by the center.

In a typical packet switch, an arbiter or arbitrator unit and associated central processing unit (CPU) controls access by a plurality of data processing (control) units vying for access to a data bus for communication with one another. That is, access for packet transmissions by the cards onto the bus is controlled by the arbitrator.

The switches used in the initial Telenet public network and various Telenet private networks are members of a multiprocessor packet switch family. By way of example, the basic packet switch includes line processing units (LPUs) for overseeing the lines to the DTEs, whether terminals, hosts or otherwise, and the network trunks (at the X.25 frame level), and a central processing unit (CPU) for routing at the packet level. The CPU, using a stored table of trunk-to-trunk active virtual circuits, maps the identity of the access-seeking LPU, its line number and the associated logical channel relative to the outgoing counterparts, for an identified virtual circuit at the respective hub.

For a communication session to proceed between the parties to a connection, it is essential that data be presented in a form that can be recognized and manipulated. The sequence of required tasks at each end, such as the format of the data delivered to a party, the rate of delivery of the data, and resequencing of packets received out of order, is generally handled in an organized manner using layered communication architectures. Such architectures address the two portions of the communications problem, one being that the delivery of data by an end user to the communication network should be such that the data arriving at the destination is correct and timely, and the other being that the delivered data must be recognizable and in proper form for use. These two portions are handled by protocols, or standard conventions for communicating intelligently, the first by network protocols and the second by higher level protocols. Each of these protocols has a series of layers.

Examples of layered architectures include the Systems Network Architecture (SNA) developed by IBM, and the subsequently developed Open Systems Interconnection (OSI) reference model. The latter has seven layers, three of which are network services oriented including physical, data link, and network layers, and the other four providing services to the end user by means of transport, session, presentation, and application layers, from lowest to highest layer.

X.25 is an interface organized as a three-layered architecture for connecting data terminals, computers, and other user systems or devices, generally referred to as data terminal equipment (DTE), to a packet-switched network through data circuit terminating equipment (DCE) utilized to control the DTE's access to the network. The three layers of the X.25 interface architecture are the physical level, the frame level and the packet level. Although data communication between DCEs of the network is routinely handled by the network operator typically using techniques other than X.25, communication between the individual user system and the respective DCE with which it interfaces to the network is governed by the X.25 or similar protocol. In essence, X.25 establishes procedures for congestion control among users, as well as call setup (or connect) and call clearing (or disconnect) for individual users, handling of errors, and various other packet transmission services within the DTE-DOE interface.

X.25 is employed for virtual circuit (VC) connections, including the call setup, data transfer, and call clearing phases. Call setup between DTEs connected to the network is established by one DTE issuing an X.25 call-request packet to the related DCE, the packet containing the channel number for the logical connections, the calling and called DTE addresses, parameters specifying the call characteristics, and the data. The destination DCE issues an incoming call packet, which is of the same general format as the call-request packet, to the destination DTE, the latter replying with a call-accepted packet. In response, the calling DOE issues a call-connected packet to its related DTE. At that point the call is established and the data transfer phase may begin by delivery of data packets. When the call is completed, i.e, the session is to end, a call-clearing procedure is initiated.

The X.75 protocol used in the Telenet public network features the same call set up and packet handling procedures as X.25, with various enhancements including higher bit rates (56 kbps) at the physical layer, extended sequence numbering at the frame layer, and additional utility field for call setup packets at the packet layer. A special multilink protocol governs handling of established virtual circuits with respect to load sharing and recovery from link failures. In the event of failure of a trunk group or transmit hub, a reconnect procedure is required to reestablish a transmission path. Each call is initiated by a user-transmitted call-request packet. It is noteworthy that the initial Telenet public packet-switched network employs the X.75 protocol for routing the call-request packet through the entire backbone network via an appropriate route, rather than merely as an interface between DTEs and DOEs or between networks. Acknowledging acceptance of calls, call clearance, and certain other functions are provided using other X.25 control packets.

In the IBM SNA layered architecture, the lower layers are data link control and path control, and the higher layers are transmission control, data flow control, and presentation services. Path control provides routing and flow control comparable to the network layer of the OSI model, and uses IBM's synchronous data link control (SDLC) to provide error-free transmission of data units over connections between nodes. The more recent high level data link control (HDLC) protocol is based on SDLC, and generally has a standard frame format consisting of an 8-bit flag field at the beginning and end of the frame to establish and maintain synchronization, address and control fields of 8 bits each, an information packet of a desired number of bits, and a 16-bit block-check field. In HDLC, an I (information transfer) format frame handles information flow, and S (supervisory) and U (unnumbered) format frames handle supervisory and control signals, the latter two types of frames being without an information field (packet).

SUMMARY OF THE INVENTION

The present invention resides, in part, in a specialized packet assembler/disassembler (PAD) to facilitate communications by IBM or IBM-compatible SDLC devices across an X.25 packet-switching network. In a presently preferred embodiment of the invention, the PAD is implemented to support communications between a host computer using an IBM $37 \times 5$ front-end communication controller and the SDLC devices. Depending on the configuration of the host and SDLC devices, the PAD according to the invention is either an HDLC PAD, or a Qualified Logical Link Control (QLLC) PAD.

An objective of the HDLC PAD implementation is to transmit SDLC frames through the network quickly and with minimal interference, while allowing those frames which do not require transmission through the network to be handled locally at their source. To those ends, three different formats or categories of SDLC commands and responses are handled; namely, (1) unnumbered format frames, which are concerned with link level functions, i.e., with managing the connection modes on the link; (2) supervisory format frames, which control the flow of information format frames and which, generally speaking, are handled locally because they do not require flow through the network; and (3) information format frames, which carry data having primary applicability above the link level and which are forwarded by the HDLC PAD virtually intact in X.25 data packets.

According to the presently preferred embodiment, four major classes of functions are performed in the HDLC PAD baseline: (i) a call set-up phase in which secondaries are solicited by a primary for connections, the primary's solicitations for connection are responded to, and the end-to-end connection is established; (ii) a data transfer phase, with transporting/forwarding of end-to-end data; (iii) a call clearing phase, where controlled termination of the connections involved in a call is initiated by the host HDLC PAD, the terminal HDLC PAD or the network itself; (iv) abnormal conditions, in which unusual or error conditions, or other conditions which are untypical, are handled.

In the QLLC PAD implementation according to the present invention, a similar goal objective exists and the functions performed are similar to those of the HDLC PAD embodiment. Differences between the two are attributable to the use of the PAD of the invention at both ends (host end and terminal end) of a connection for the HDLC PAD embodiment, whereas a PAD according to the invention is provided at only one end of the connection in the QLLC PAD embodiment.

It is, therefore, a principal object of the present invention to provide a packet assembler/disassembler which facilitates communications between SNA end-point physical units through a packet switching network.

BRIEF DESCRIPTION OF THE DRAWINGS

The above and still further objects, features and attendant advantages of the present invention will become apparent to those skilled in the art to which the invention pertains from a consideration of the following detailed description of certain presently preferred and alternative embodiments thereof, when taken in conjunction with the accompanying drawings in which:

FIGS. 5, 6, 8, 9, 12, 14, 18, 20, 22, 23, and 24 show the general format of various SDLC frames utilized in the HDLC embodiment.

DETAILED DESCRIPTION OF THE PREFERRED EMBODIMENTS

System Overview

In essence, the HDLC PAD/QLLC PAD of the present invention constitutes a set of software modules for a packet switch which allows IBM (or IBM-compatible) SDLC devices to communicate across an X.25 packet-switching network. As was noted above, SDLC is simply a subset of HDLC, and a principal object of the HDLC PAD/QLLC PAD is to provide communications between systems network architecture (SNA) end-point physical units through the packet switching network. In a QLLC PAD embodiment of the invention, connections are provided involving qualified logical link control at one end, such as an IBM network control program packet switching interface, and synchronous data link control (SDLC) at the other. In an HDLC PAD embodiment of the invention, connections are provided which employ SDLC at both ends, with line speeds of up to 64 kbps.

Referring now to FIG. I, the presently preferred HDLC PAD (HPAD) embodiment is adapted to support communications between a host computer 10 using an IBM 37×5 front-end communication controller 12 or equivalent, for example, and a plurality of IBM SNA/SDLC 3274 terminal control units (CUs) 15-1, ... 15-n, with a variety of attached terminals 18 (e.g.. displays and printers). At present, IBM 3274 based terminal clusters and compatibles are the most commonly encountered type of SNA/SDLC device. It will be understood by those skilled in the art from a consideration of this specification, however, that the principles of the present invention are applicable as well to other types of computers and terminals.

A packet switch serving as a DCE or DTE 23 with a set of HPAD software modules 26, interfaces between the SDLC for front end communication controller 12 and the X.25 for the packet switching network (PSN) 28. At the other end of the PSN, another packet switch acting as a DCE or DTE 30 includes HPADs 33 for interfacing between the X.25 of the PSN and the SDLC of the CUs.

Figure 1:
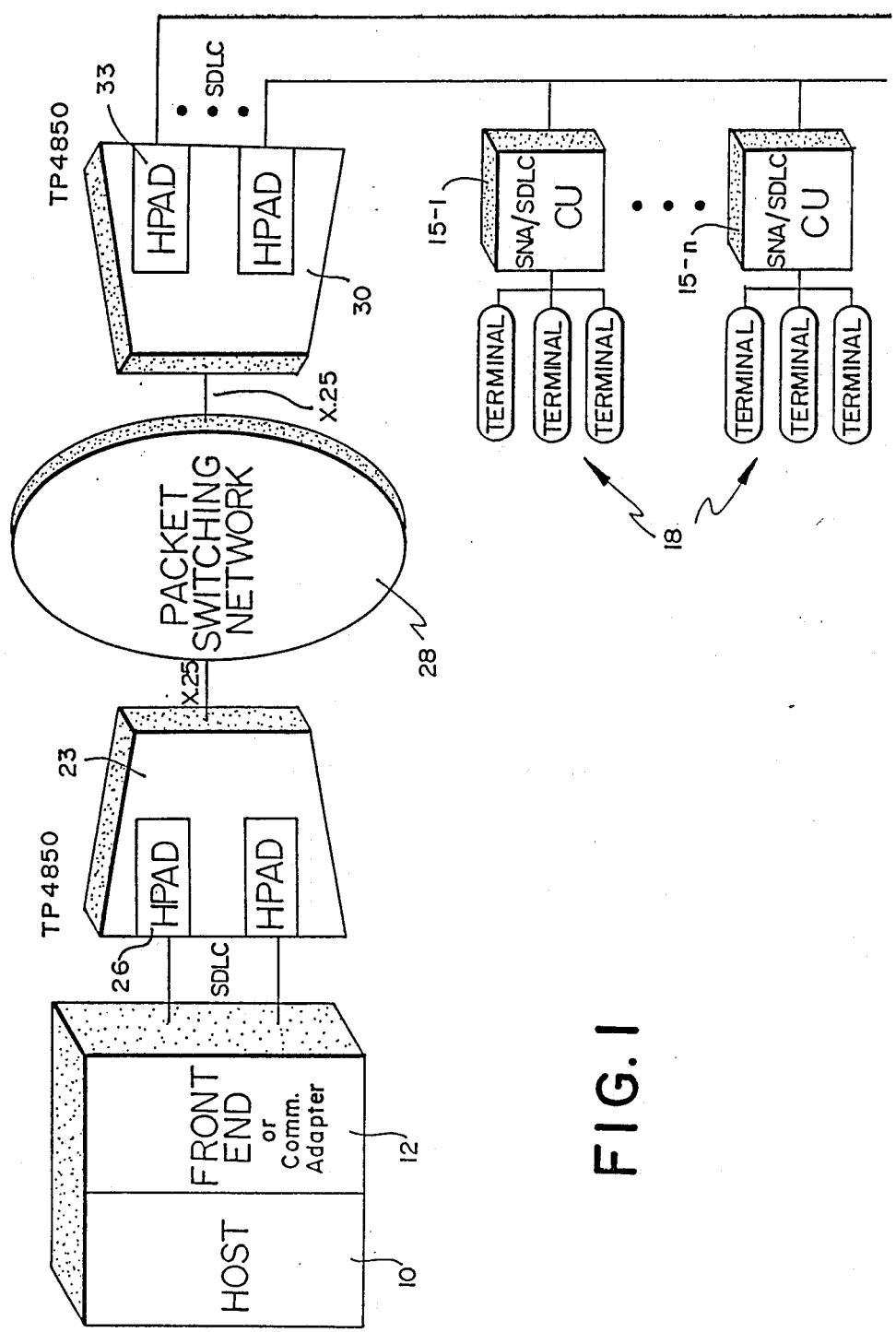
FIG. 1 is a block diagram of a connection for communication session between a host and one or more end users illustrating an HDLC PAD arrangement for SDLC secondary to SDLC primary.
Figure 2:
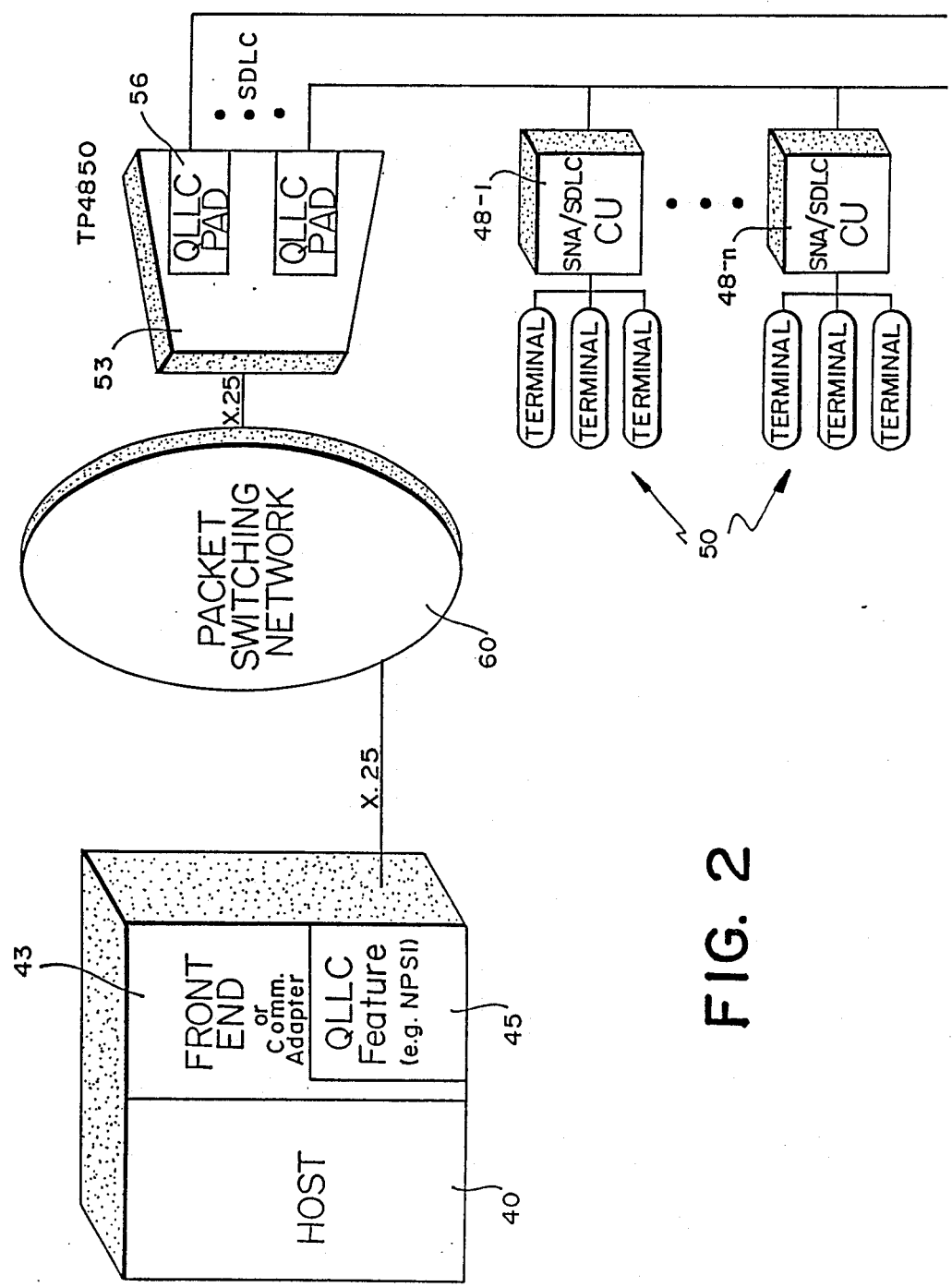
FIG. 2 is a block diagram of a connection for communication session betWeen a host and one or more end users illustrating a QLLC PAD arrangement for SDLC secondary to QLLC primary.
Figure 3:
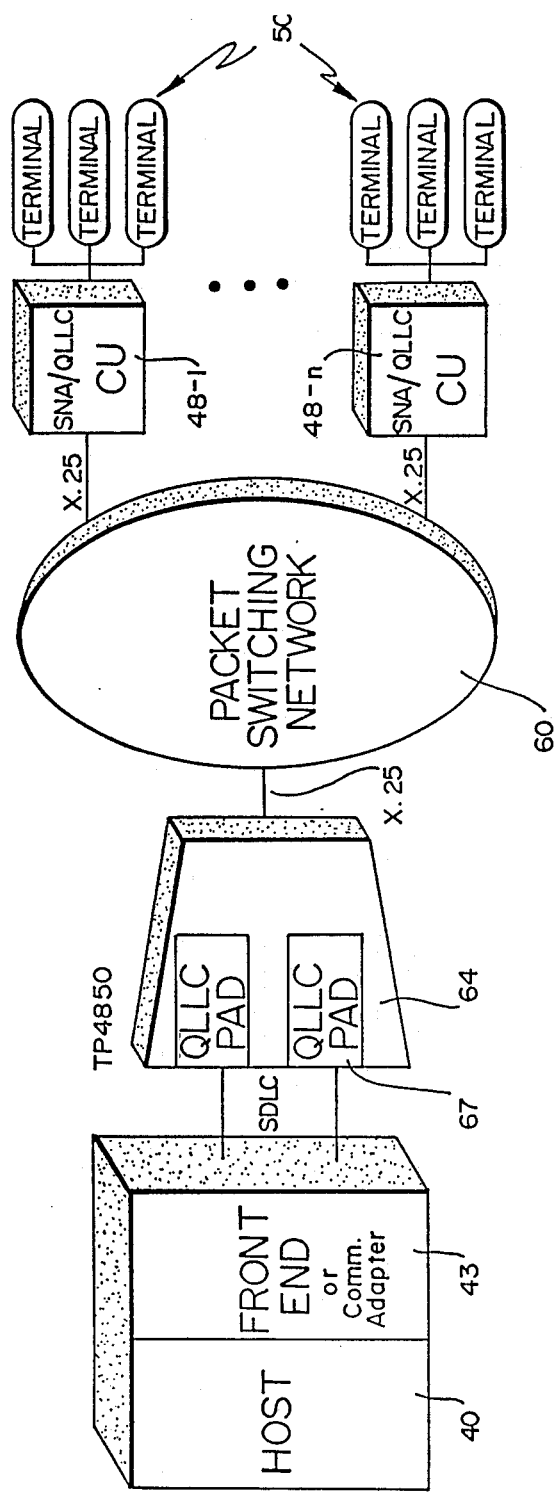
FIG. 3 is a block diagram of a connection for communication session between a host and one or more end users illustrating a QLLC PAD arrangement for QLLC secondary to SDLC primary.

Referring now to FIGS. 2 and 3, a QLLC PAD embodiment according to the present invention is adapted to support communication between a host computer 40 using an IBM 37×5 front-end communication controller 43 or equivalent, with network control program packet switching interface (NPSI) support 45 (FIG. 2), and such SDLC devices as IBM SNA/SDLC 3274 terminal control units 48-1, .., 48-n, and associated terminals 50, or IBM SNA/SDLC 3770 data communication system, IBM SNA/SDLC 3767 communication terminal, and/or IBM 37×5 front-end communication controller communicating via SDLC link. Here, again, the usage for or in connection with IBM devices is exemplary only and is not intended as a limitation on the use of the invention.

In the configuration of FIG. 2, a packet switch serving as a DCE or DTE 38 with a set of QLLC PAD software modules 56, interfaces between the X.25 of the PSN 60 and the SDLC of the CUs, in an SDLC secondary to QLLC primary arrangement. In the configuration of FIG. 3, the DTE or DCE 64 with QLLC PAD software modules 67 interfaces between the SDLC for front end communication controller 43 and the X.25 for PSN 60, in a QLLC secondary to SDLC primary arrangement.

HDLC PAD (HPAD)

It is useful, first, to understand the nature of the various types of links (circuits) in which the invention may be utilized. In a half duplex physical link, modems servicing the link can only handle data flow in one direction at a time. This is because of either an inability to support simultaneous data flow on multiple frequencies on a two wire circuit or an inability to disable echo suppressors. The Request to Send and Clear to Send leads between the DTEs and modems determine when the DTE is allowed to transmit. In a full duplex link, modems servicing the link support simultaneous transmission in both directions on the link, as a result either of having a four wire circuit or of the ability to support simultaneous transmission on different frequencies in different directions and to disable echo suppressors on a two wire circuit. In a point-to-point link, exactly two DTEs are connected by the link. A switched link configuration has DTEs connected to the link dynamically or temporarily for the duration of a specific activity, as most commonly occurs via a voice-oriented public Direct Distance Dial telephone network. In a multi-point or multi-drop link, two DTEs are connected to the same link, and one assumes the role of master or primary to coordinate when each of the other DTEs (slaves or secondaries) is allowed to transmit.

The goal of the HPAD is to get SDLC frames through the network as quickly as possible with as little interference as possible, subject to necessary support for specific device, customer or network management feature requirements. Frames which need not flow through the network are handled locally at their source. To achieve this goal, formats or categories of SDLC commands and responses are utilized for unnumbered format frames, supervisory format frames, and information format frames.

The unnumbered format SDLC frames are concerned with link level functions, for managing the connection modes on the link. Mode changing unnumbered frames are either handled locally or generate sequences of virtual circuit status changing X.25 packets. The other unnumbered format frames are forwarded through the packet switched network enveloped in DQ packets, the latter being X.25 DTE/DCE data packets with qualified bit set to binary 1 (ON) in the general format identifier field. DQ packets are a non-destructive means of communicating control information in that they do not directly cause a change in the status of the virtual circuit. In the HPAD, DQ packets are also used to forward information on error conditions or abnormal conditions, and to forward information which may require special processing by the PAD at the other end of the virtual circuit connection.

The supervisory format frames control the flow of information format frames during the data transfer phase, that is, when at least one secondary station on a link is in normal response mode. In general, these frames are handled locally because it is unnecessary to forward them through the packet switched network.

The information format frames are the only ones carrying data having primary applicability above the link level (layer). These frames are forwarded intact by the HPADs in X.25 non-qualified DTE/DCE data packets, except that information frames which are longer than the maximum packet size allowed on the virtual circuit are split into multiple packets of the proper size and forwarded with a "more data" bit set to ON (binary 1) in all but the last of the packet segments. The packets are then reassembled into the original information frame by the HPAD at the destination side.

The HPAD performs four major classes of functions, including a call setup phase, a data transfer phase, a call clearing phase, and abnormal conditions handling. The call setup phase involves soliciting secondaries for connections, responding to primary's solicitations for connection, and then establishing the end-to-end connection. The data transfer phase involves transporting/forwarding of end-to-end data. The call clearing phase involves controlled termination of the call connections, as initiated by the host HPAD, the terminal HPAD, or the packet switching network itself. The abnormal conditions handling relates to any unusual or error conditions.

Call Setup Phase

Figure 4:
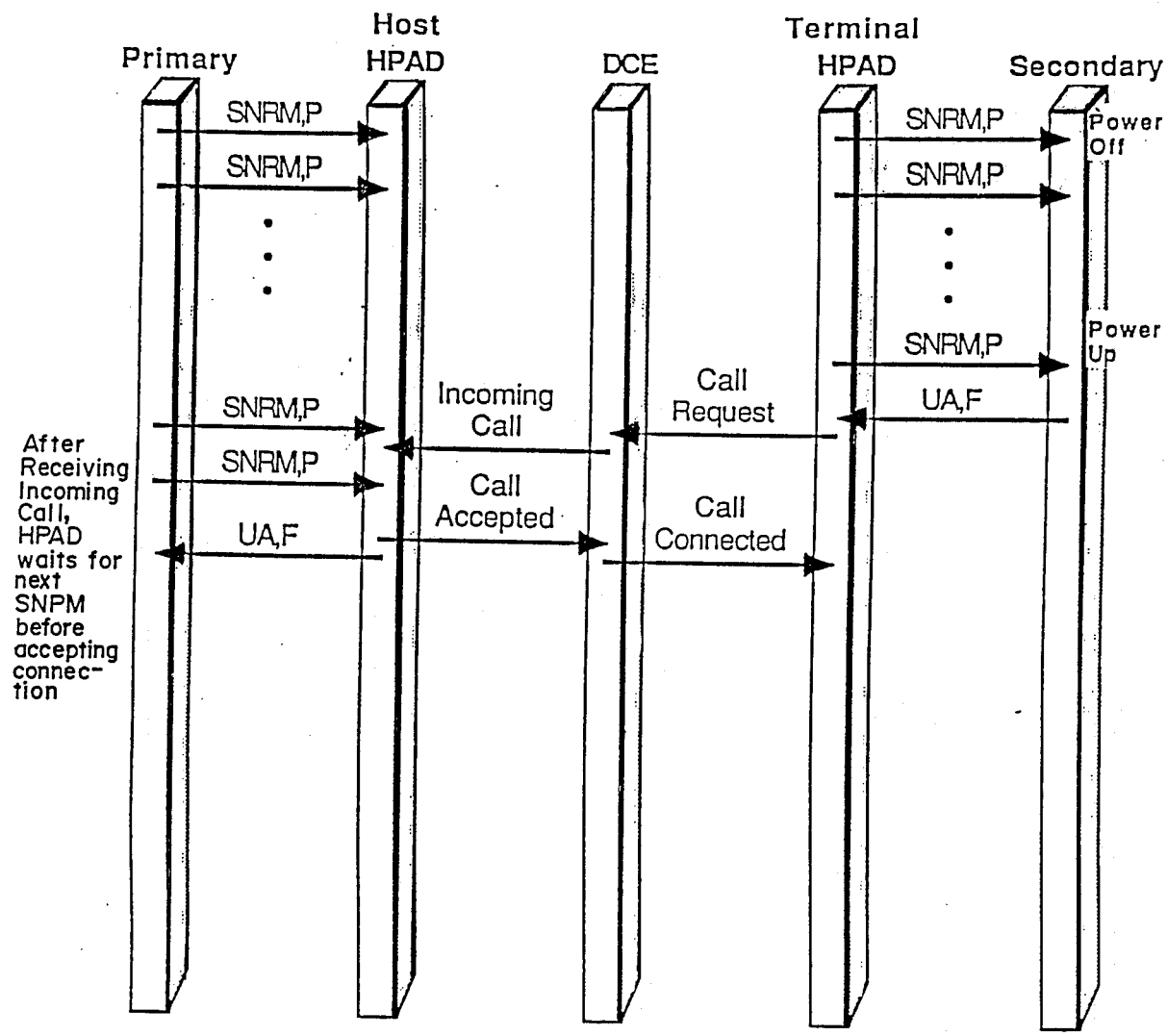
FIGS. 4, 10, 11, 13, 16, 17, 19, and 21 diagram the procedures of a call setup, small and large information frame data transfers, polling interval, call clearing initiated by host, call clearing initiated by terminal, call clearing by PSN to host, and call clearing by PSN to terminal, respectively, utilized in the HDIC PAD embodiment.
Figure 7A:
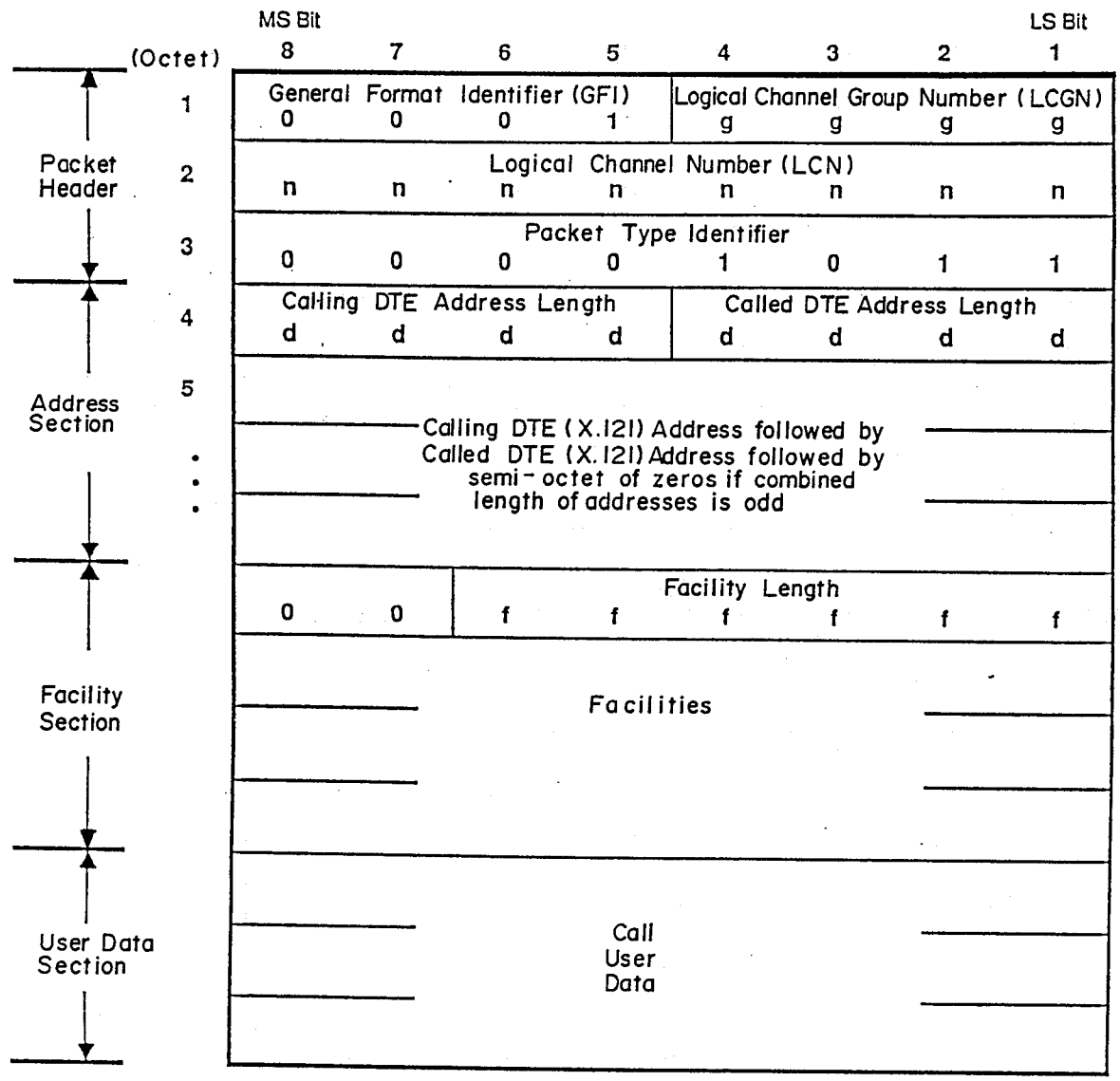
FIGS. 7a, 7b, and 15 illustrate various X.25 used in the embodiments of the invention.

The call setup phase proceeds as follows, the procedures being diagrammed in FIG. 4. The terminal HPAD follows an automatic connection procedure for call establishment. In essence, this procedure dictates that as soon as the terminal PAD makes contact with a control unit, it initiates a virtual call to a predetermined address in a host HPAD, specifying a predetermined SDLC link and control unit address for the connection to be accepted for the virtual call. In the case of a terminal HPAD to terminal call setup, when the terminal HPAD detects an operational SDLC link, it periodically transmits SDLC set normal response mode command frames with poll bit set to ON (binary 1) (SNRM,P) to each control unit on the link. The general format of the SNRM frame is shown in FIG. 5. The address field of this frame specifies a preconfigured unique station address for each control unit. When an SDLC unnumbered acknowledgement response frame with final bit ON (UA,F, the general format of which is shown in FIG. 6) is received from a control unit, the terminal HPAD initiates a virtual call to the host HPAD which was predefined for connections from that particular control unit. Also, a specific host link, and the control unit address to be emulated on that host link, are predefined for connections from that same control unit. In the case of a terminal HPAD to host HPAD call set-up, the terminal HPAD sends an X.25 call request packet (FIG. 7a, corresponding also to an incoming call packet) to the predetermined host HPAD. The unique information is contained in the call user data section of that packet.

The addressing scheme may be either specific or nonspecific. In specific addressing, there is a one-to-one mapping between origin device addresses and destination device addresses, whereas in non-specific addressing a particular origin device address can be mapped to any address within a designated pool of addresses at the destination.

For purposes of host HPAD validity checking, when it receives an incoming call packet (i.e., a call request packet), the host HPAD makes several checks before attempting to connect to the host. It must verify that the simulated control unit (a logical control unit, or LCU) specified by the destination address unique information in the incoming call packet call user data section is not already in use on another virtual call. Further, it must check the source address specification in that packet section against the privacy list (if provided, a list of source addresses authorized to call or excluded from calling the destination address in question) for the specified destination address. If both of these validity checks are successful, the host HPAD attempts to complete the connection on the host link.

Figure 7B:
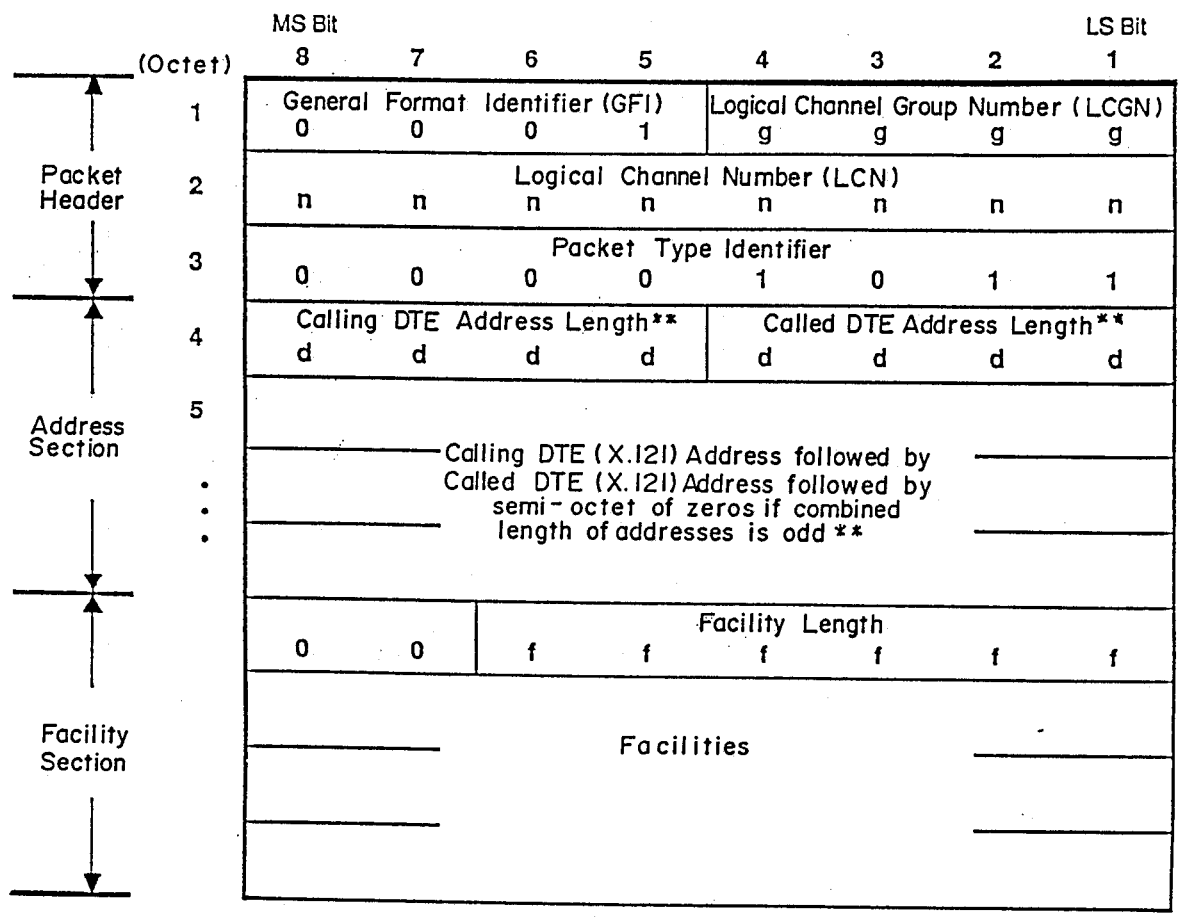

To complete the connection to the host, the host HPAD transmits, on the host line specified by the destination address of the incoming call packet, an SDLC unnumbered acknowledgement response frame with the final bit set to ON (UA,F, FIG. 6) and the address field containing the control unit address. However, that frame cannot be transmitted until the next occasion that the host HPAD receives an SDLC SNRM,P command frame (FIG. 5) and the address field containing that control unit address, on the specified host line. Immediately after the UA response frame (FIG. 6) has been transmitted, the host HDLC PAD sends an X.25 call accepted packet back to the terminal HPAD. The general format of the call accepted packet (which corresponds as well to a call connected packet) is shown in FIG. 7b.

Data Transfer Phase

Figure 8:
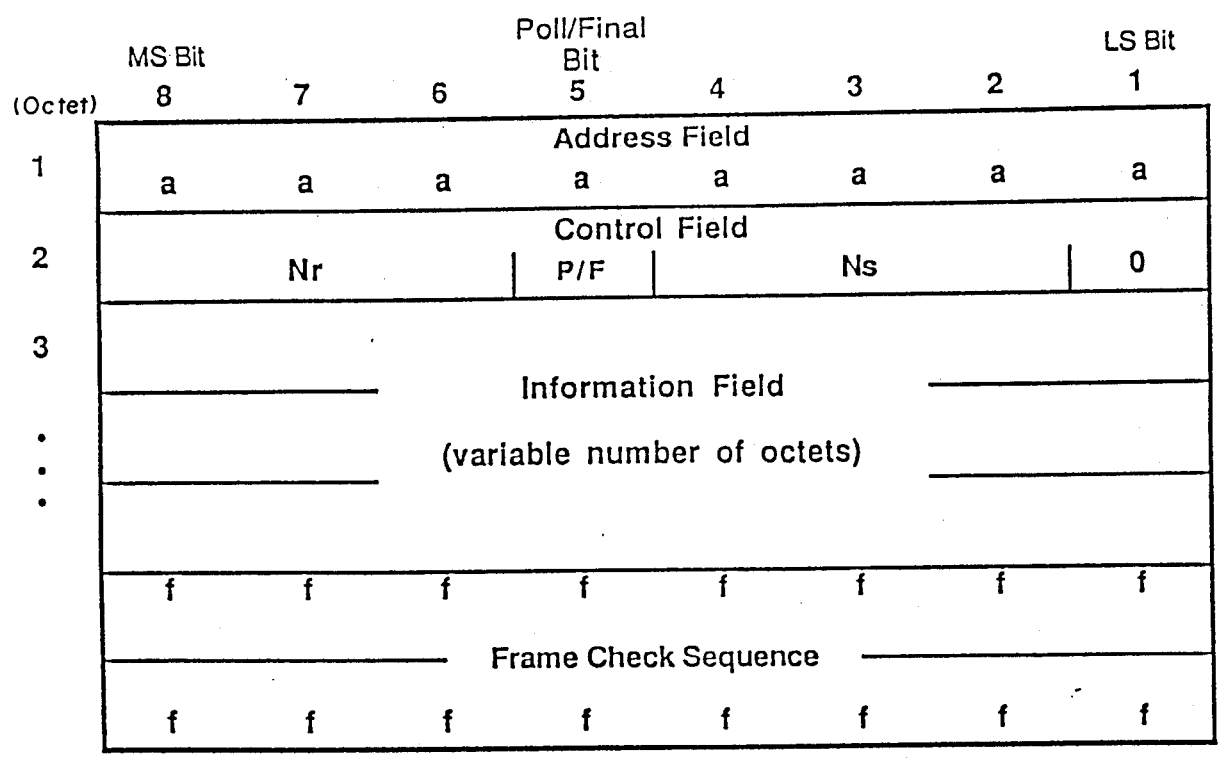
Figure 9:
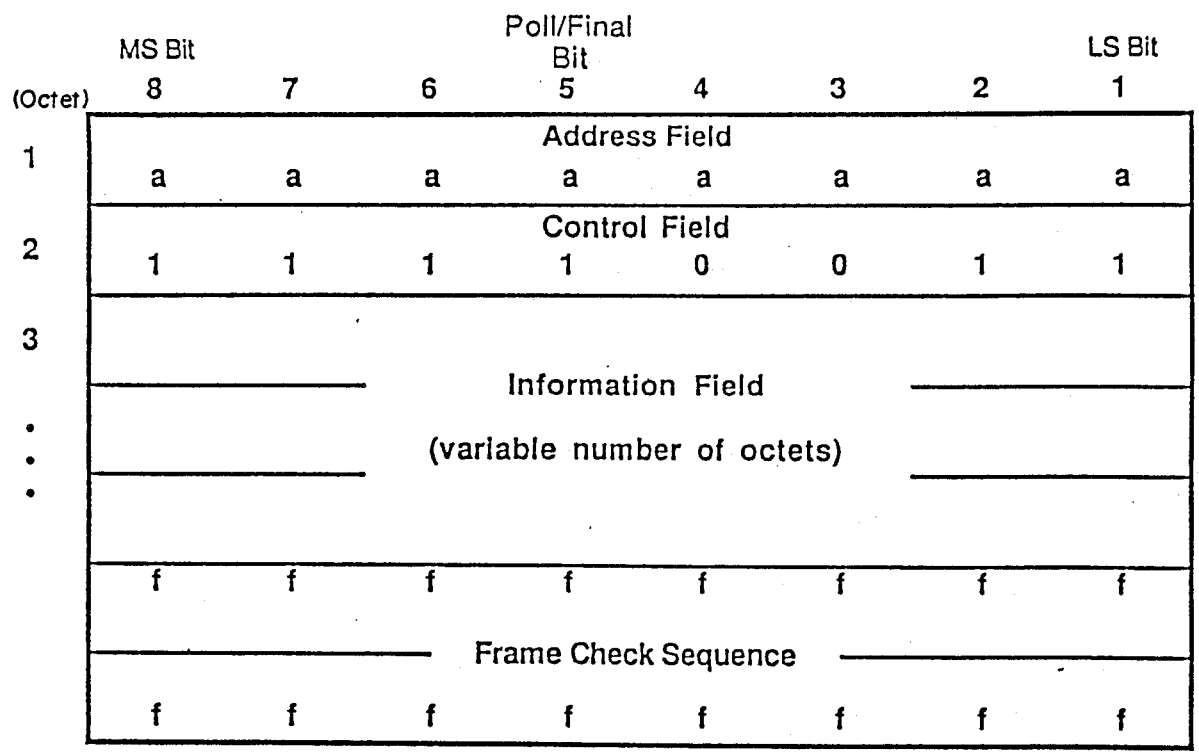
Figure 10:
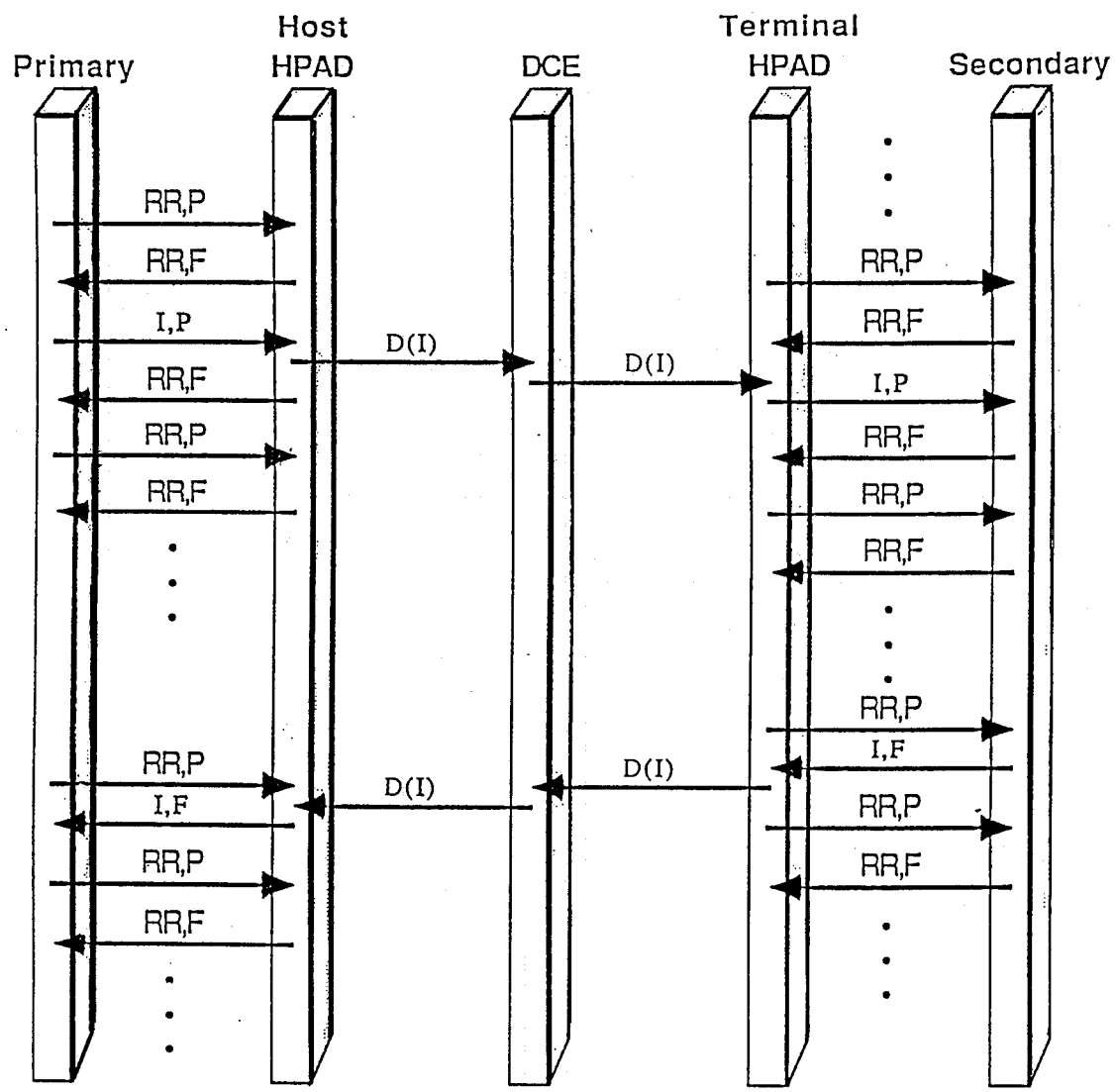
Figure 11:
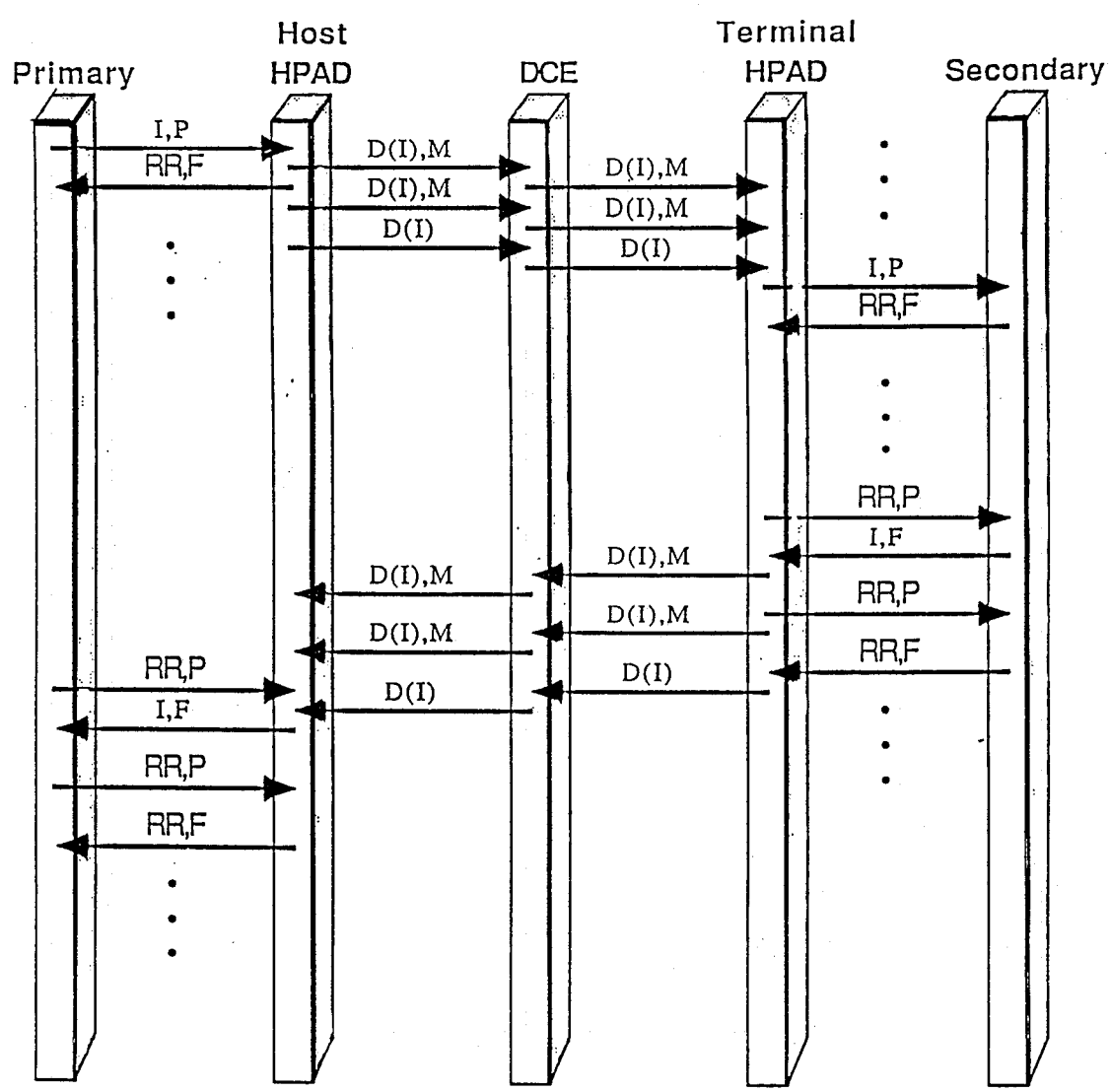
Figure 13:
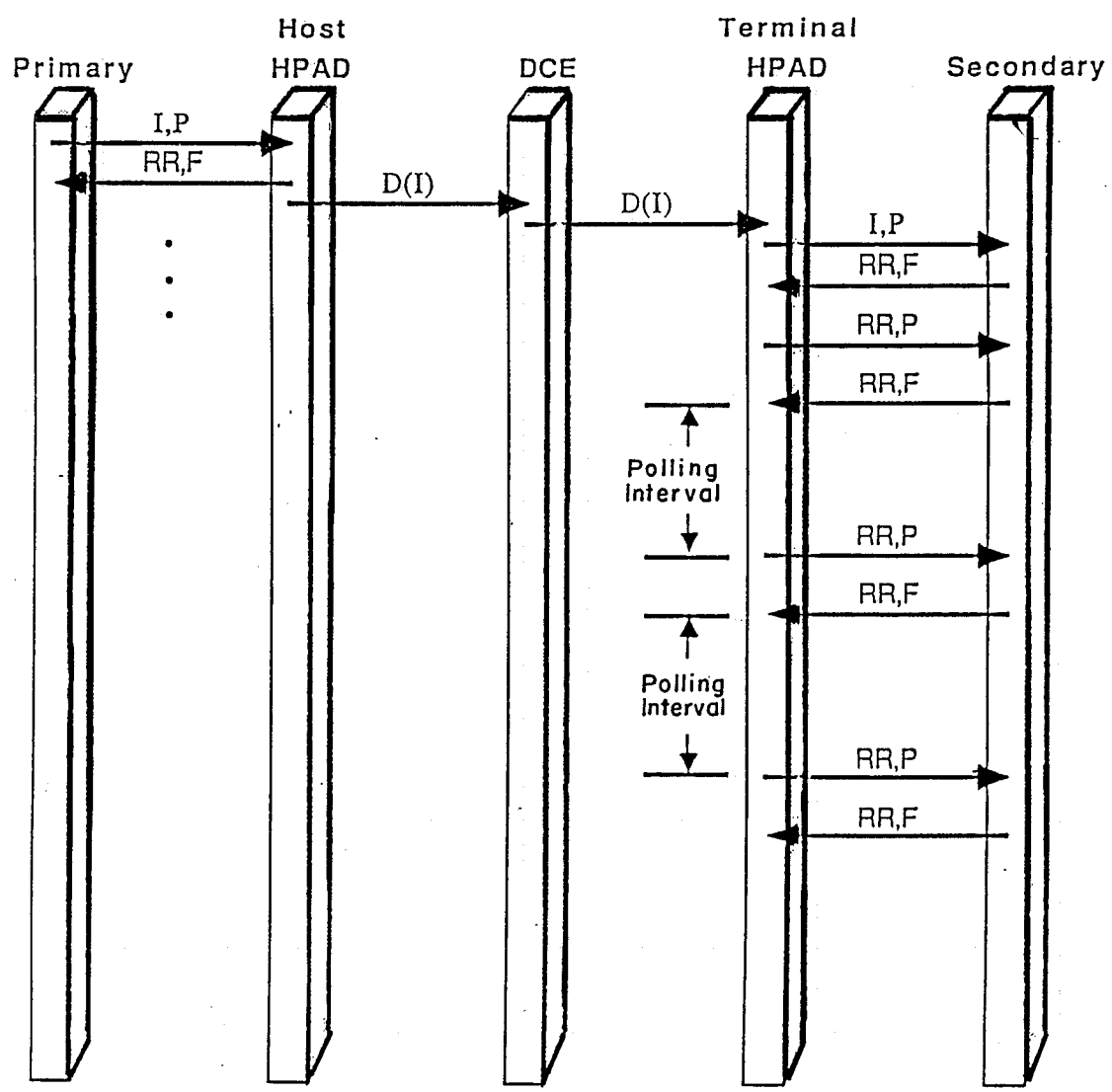

The data transfer phase commences at the host HPAD leg of this connection as soon as the UA response frame (FIG. 6) is transmitted. This phase involves DTE-to-DTE transfer of data which has significance above the link control layer, i.e., application data or control data for the higher protocol layers. SDLC information format frames (I-frames, the general format of which is shown in FIG. 8) convey the data, whereas SDLC supervisory format frames coordinate the process of exchanging I-frames. Non-mode-changing unnumbered format frames may flow during the data transfer phase but are not involved in the data transfer function. An example of the latter frames is an SDLC test frame (FIG. 9). Processing of I-frames is diagrammed in FIG. 10, for small 1-frames, and FIG. 11, for I-frames longer than packet size. In the Figures: D(I) indicates X.25 DTE/DCE data packet; I,F indicates SDLC I-frame with final bit ON; I,P is SDLC I-frame with poll bit ON; RR,F is SDLC receive ready frame with final bit ON; and RR,P is SDLC receive ready frame with poll bit ON The general format for SDLC RR command/response frames is shown in FIG. 12.

I-frames received by the host HPAD from the host are forwarded through the network in either of two ways. If the size of the I-field in the I-frame is sufficiently small to fit within a single X.25 DTE data packet (of maximum allowable size for the network), the entire I-field is sent in that packet. However, if the I-field is too large, the host HDLC PAD will split it into segments of the proper size and send these segments in several successive DTE data packets. The same process is followed at the terminal HPAD for I-frames received from a control unit. It should be observed that only the I-field portion of the received frame (whether at the host or terminal HPAD) is forwarded in a DTE data packet, because the flag, address, control and frame check sequence portions of the frame have significance only on the local link between the PAD and the host or control unit.

SDLC/X.25 address correlation is provided by a one-to-one relationship between the line/control unit involved in each active virtual call for each HPAD and a particular logical channel group number/logical channel number defined at the PAD. When the host HPAD receives a DCE data packet from the packet switching network, it commences construction of an SDLC I-frame in which the I-field contains data from the user data field of a single packet or from each successive packet to that designated with a "more data" bit off. A corresponding process takes place when the terminal HPAD receives an X.25 DCE data packet from the network.

In a host HPAD-to-host transmission (i.e., the PAD acting as the primary side of the connection), the PAD must wait until there is an outstanding poll for the particular control unit address on the particular line before it may begin transmission of the I-frame. If more than one I-frame is ready to be transmitted for this control unit, the number of frames transmitted Is dependent upon the window size limitations. A similar process takes place with a terminal HPAD-to-control unit connection, except that since the PAD is acting here as the primary side of the connection, it may transmit an SDLC I-frame only when a poll is not outstanding on the line.

Frame acknowledgement and steady state link maintenance for the SDLC links in the data transfer phase are partially the responsibility of the host and terminal HPADs. Three modulo-8 counts are maintained for each control unit in the data transfer phase, these being (1) the Ns count, which is the frame sequence number (modulo 8) to be given to the next I-frame to be transmitted by the PAD to the respective control unit; (2) the Nr count, which is the frame sequence number in the next I-frame expected to be received by the PAD from the respective control unit; and (3) the lower window edge, which is the frame sequence number of the current "lower window edge" for the respective control unit as the last sequence number that the other side of the connection (from the PAD) confirmed as having been received. A configurable parameter SDLC window size is specified for each control, and the sum of the lower window edge and the the window size yields the next frame sequence number which may not be transmitted because it would exceed the window.

In the handling of counts, each time the HPAD trnsmits an I-frame, it enters the current Ns count in the control field of the I-frame and then increments the saved Ns count value. The same is done with the current Nr count value, except that value is not updated (incremented) when an I-frame is transmitted but, rather, when I-frames are successfully received. The Ns count value of the received I-frame must match the Nr count value at the receiving station, for a successful receipt of the I-frame. The Nr count in the received I-frame updates the lower window edge count, and confirms that the transmitting station had successfully received all I-frames previously transmitted by this receiving station through the I-frame whose Ns value was equal to the Nr value in the frame now being received.

Host HPAD link maintenance is provided in the following manner. The host HPAD periodically receives RR,P frames for control units for which the host has sent no I-frames for a predetermined period of time. An Nr count in the control field of the receiver ready frame updates the lower window edge count for the respective control unit in the host HPAD. Transmission or reception of a data packet on the virtual circuit corresponding to a connection to a particular control unit also resets an inactivity timer associated with that control unit. With respect to poll responses, the host HPAD receives a poll from the host for a particular control unit, either piggy-backed on an I-frame or via a receiver ready frame. If the PAD has no I-frames to transmit to the host for that control unit, then it transmits an RR,F frame, the current Nr count entered in the control field, and the control unit address entered in the address field.

A similar process is followed for the terminal HPAD link maintenance, except that because it is acting as a primary SDLC station, the terminal HPAD must generate and transmit RR,P frames periodically, as specified in the "polling interval" configuration parameter, to each control unit during periods when there is no data to send to them. In those situations, the receiver ready frame specifies the control unit's address in the address field and the terminal HDLC PAD's current Nr count for that control unit in the control field, as shown in FIG. 18. The polling interval capability is used, for example, to avoid overwhelming some types of control units unable to handle continuous polling.

The data transfer phase is maintained in the foregoing manner until either permanent error condition or normal clearing occurs, to be described below.

Call Clearing Phase

Figure 15:
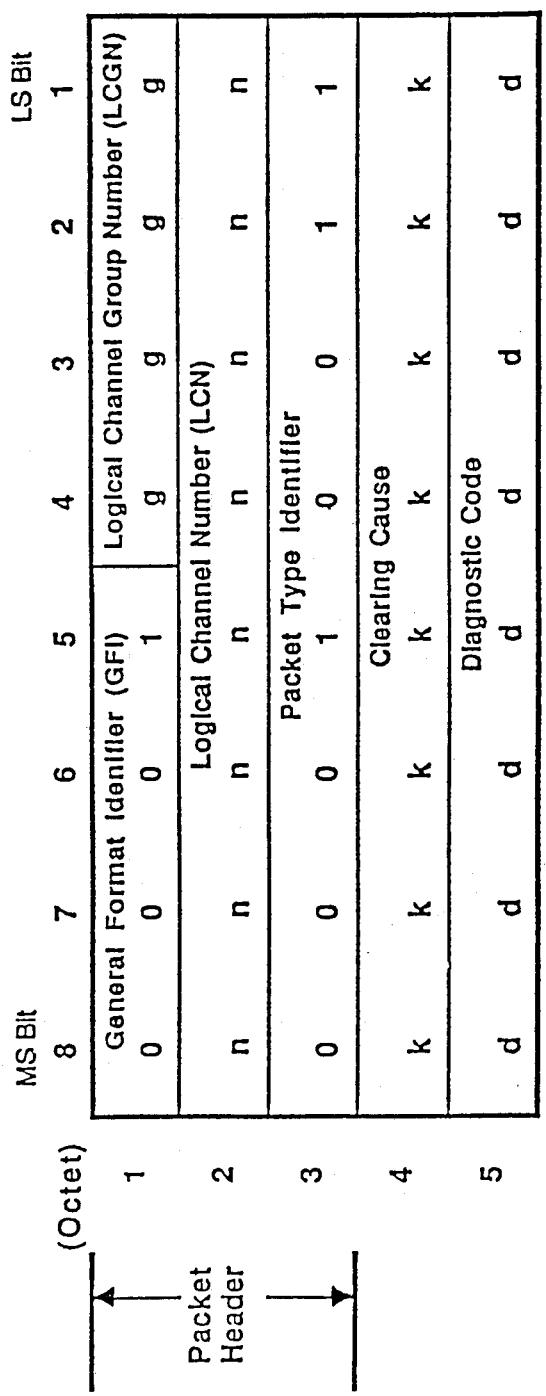

Normal call clearing is initiated by issuing a network management request to deactivate the connection in the case of non-switched type SDLC connections, which are the only types supported by the HPAD baseline implementation according to the presently preferred embodiment of the invention. Normal call clearing for the HPADs occurs when the connection is in the data transfer phase and the PAD receives one of a particular set of SDLC command/response frame sequences and/or X.25 control packet sequences. At the host HPAD, normal call clearing for a particular connection is initiated when clearing stimuli is received in the form of an SDLC disconnect (DISC) command frame (FIG. 14) from the host for a particular control unit on a particular line, or an X.25 clear indication packet (FIG. 15, which corresponds as well to a clear request packet) from the packet switching network. At the terminal HPAD, normal call clearing is initiated when clearing stimuli is received in the form of an X.25 clear indication packet from the packet switching network, or an X.25 DCE data packet with the qualifier bit set to ON and an appropriate user data field. It will be understood, of course, that abnormal conditions may occur which result in call clearing.

Figure 16:
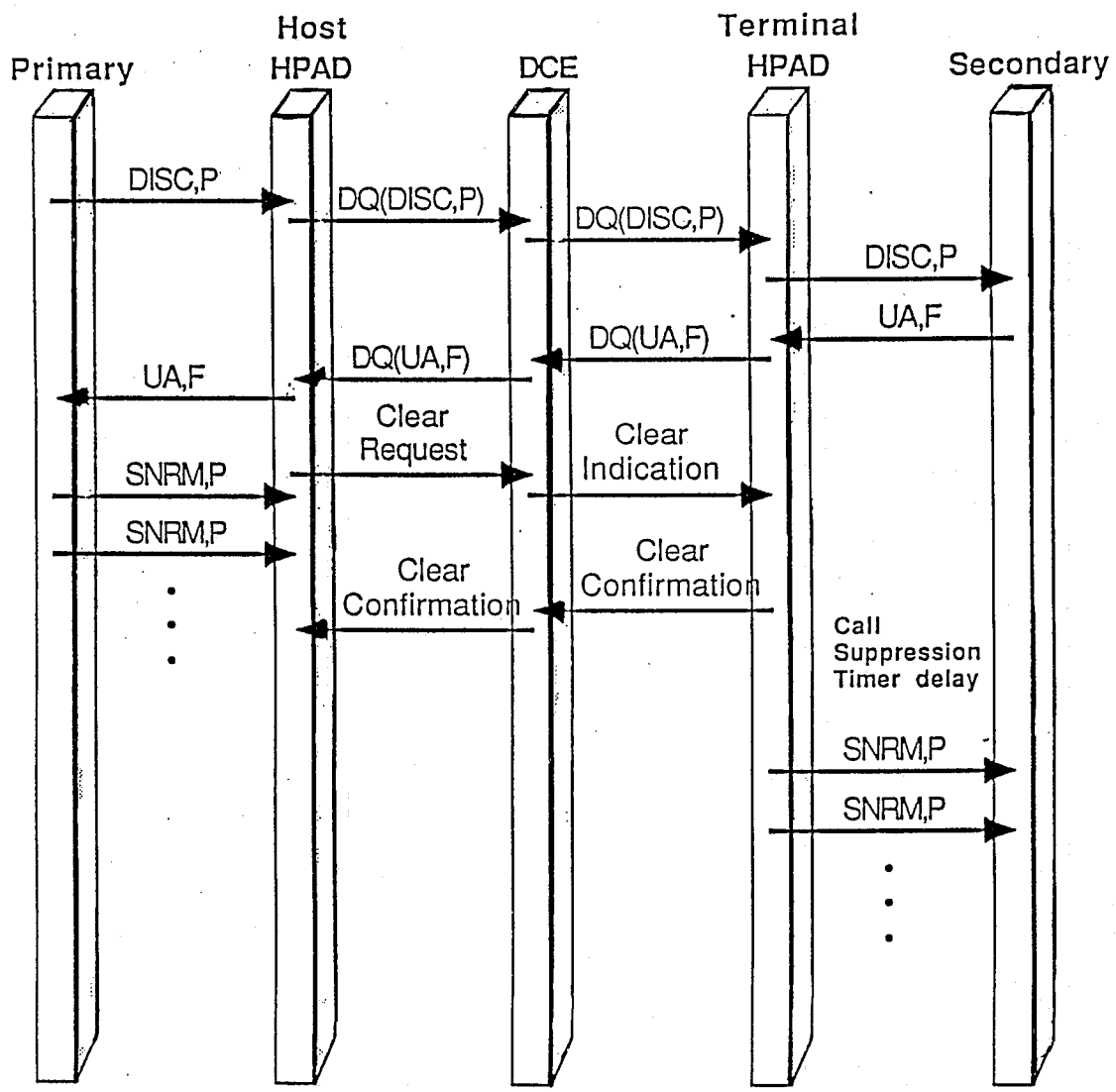

Host initiated call clearing is implemented by an unsolicited SDLC DISC frame from the host itself. The protocol sequences involved are diagrammed in FIG. 16. When the host HPAD receives an SDLC DISC command frame from the host on a particular line for a particular control unit, the PAD generates and transmits an X.25 DTE data packet with a general format (of the type shown, for example, in FIG. 7) containing the desired information. Upon receipt of that data packet (as X.25 DCE) by the terminal HPAD, it sends an SDLC DISC command frame (FIG. 14) to the line/control unit designated as part of the information contained in the packet.

When the terminal HPAD receives the SDLC UA response frame from the control unit to acknowledge the DISC command, the PAD builds and transmits an X.25 DTE data packet of the same general format as was described above, containing the desired information. Upon receipt of that data packet (as X.25 DCE) by the host HPAD, if there is no indication that the host has already recognized a permanent timeout condition for this control unit, the PAD will build and transmit an SDLC UA response frame for the line/control unit designated as part of the information contained in the X.25 DCE packet.

For the host HPAD virtual circuit clearing action, as soon as it transmits the UA response frame, the PAD builds and transmits an X.25 clear request packet (FIG. 15) which is received by the terminal HPAD as an X.25 clear indication packet. The terminal PAD then provides an X.25 packet level acknowledgement by building and transmitting an X.25 clear confirmation packet specifying the line/control unit designated as part of the information contained in the clear indication packet The terminal HPAD waits for a period of time defined by a call suppression timer configuration parameter after receiving the DTE initiated clear indication, and then goes into the start of the call setup phase for the affected control unit. Similarly, when the host HPAD receives the X.25 DCE clear confirmation packet from the packet switching network, it immediately goes into the start of the call setup phase.

Figure 17:
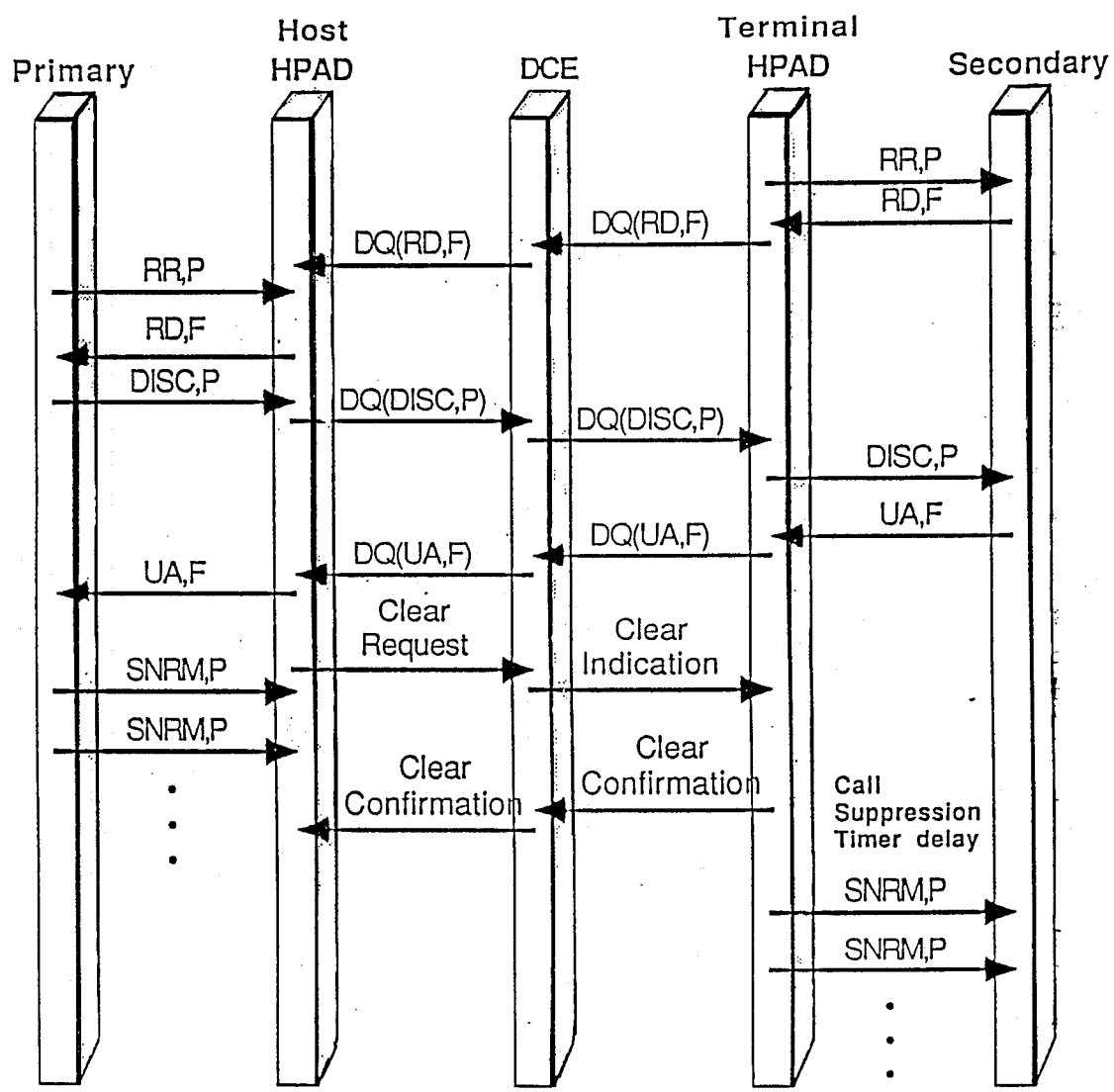

Terminal initiated call clearing is diagrammed in FIG 17, the sequence beginning with a control unit providing an SDLC request disconnect frame with final bit ON (RD,F, shown in FIG. 18) in response to a poll from the terminal HPAD. The legends indicated in FIG. 17 have been defined above. When the terminal HPAD receives this RD frame from a particular control unit on a particular line, the PAD builds and transmits an X.25 DTE data packet containing the desired information. That data packet (as X.25 DCE) is received by the host HPAD, which waits until the next poll for the line/control unit designated as part of the information contained in the received packet and then transmits to the host an SDLC RD response frame for that line/control unit. In a normal situation the host sends an SDLC DISC command frame to the for the particular line/control unit, and, from that point forward, the procedure is identical to that described above for the host initiated call clearing.

Figure 19:
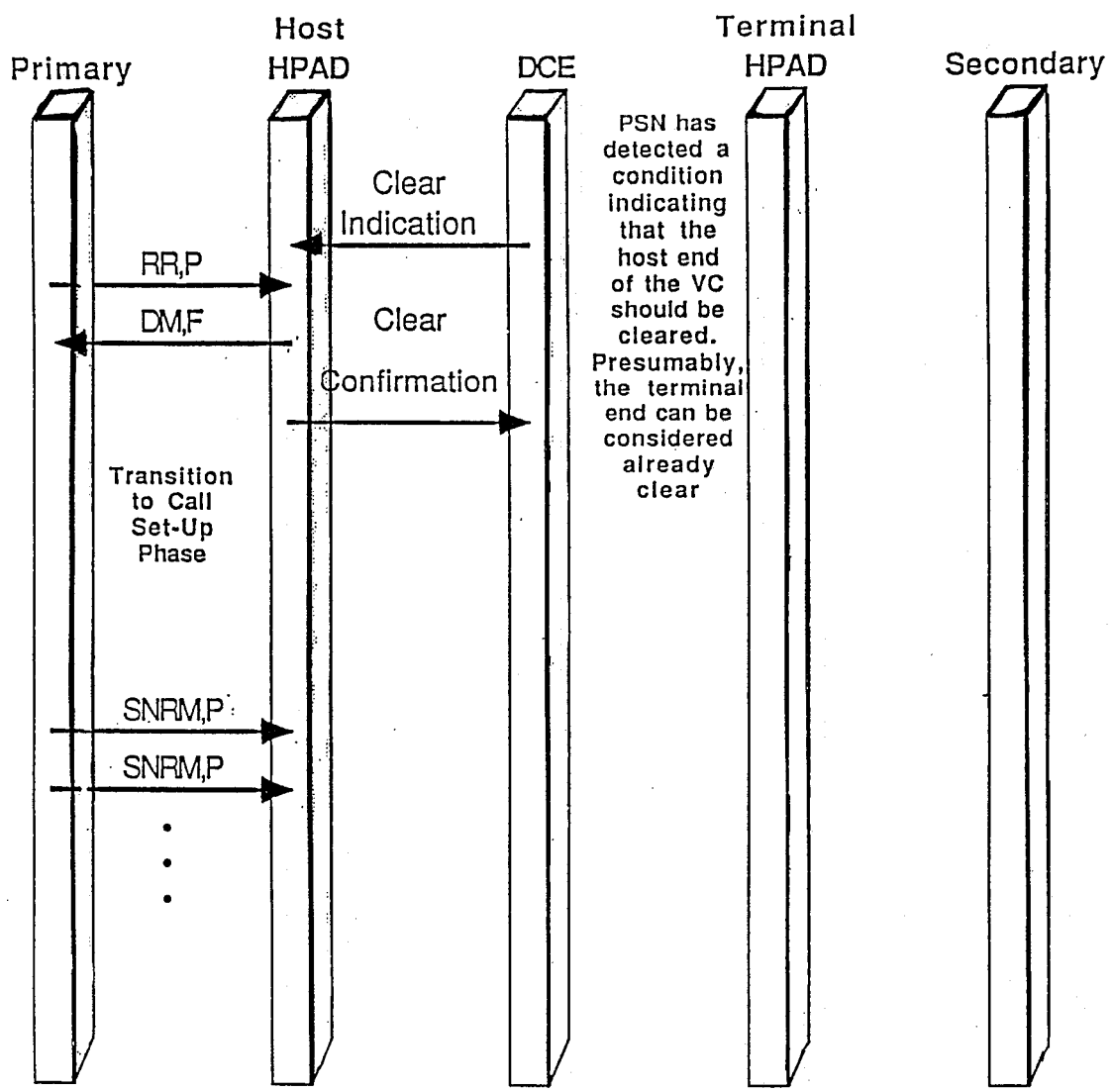

Packet switching network (PSN) initiated call clearing for the host is diagrammed in FIG. 19. When the clear indication is generated by the PSN, the presumption is that the remote end of the connection (i.e., the terminal HPAD) is already clear or is being cleared by the PSN. When the host HPAD receives the X.25 clear indication packet with a field indicating that the PSN initiated clearing, the PAD waits until the next poll for the line/control unit designated as part of the information contained in the received packet and then transmits to the host an SDLC disconnect mode response frame with final bit ON (DM,F, the general format of which is shown in FIG. 20) for that line/control unit. The host HPAD then sends an X.25 clear confirmation packet back to the PSN, specifying the same line/control unit as was designated in the clear indication packet. The start of call setup phase is then entered for that line/control unit.

Figure 21:
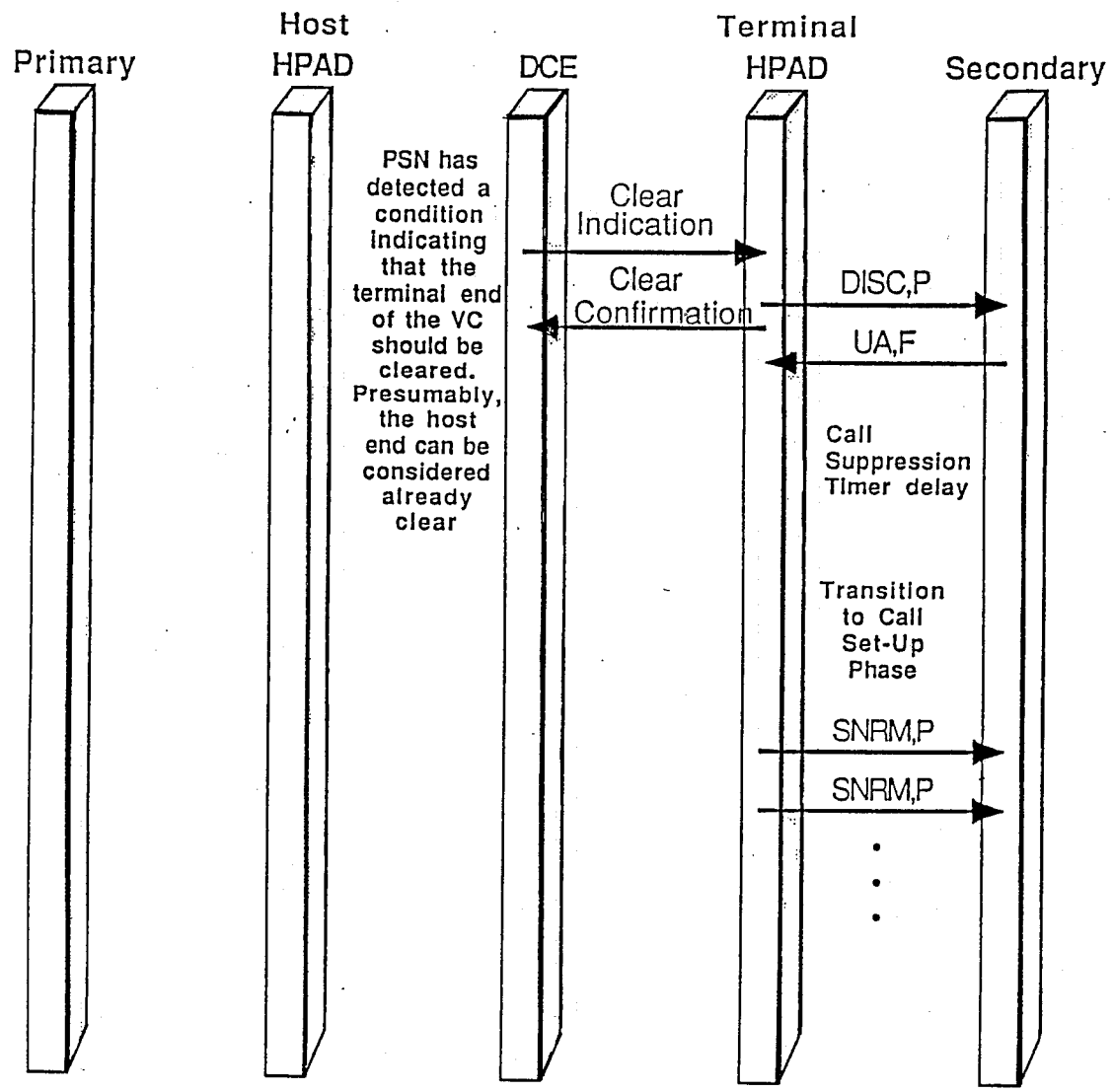

The protocol sequences involved in the PSN (DCE) initiated call clearing to a terminal is diagrammed in FIG. 21. The procedure is similar to that described above for the PSN initiated call clearing to host, but with differences attributable to the terminal HDLC PAD acting as a primary SDLC station and the host HDLC PAD acting as a secondary station. In particular, when the terminal HDLC PAD receives the DCE-generated X.25 clear indication packet, the PAD waits until there is not a poll outstanding for the line/control unit designated by the field information contained in the received packet, and when that occurs, transmits an SDLC DISC command frame with poll bit ON (DISC,P) to that line/control unit. The terminal HDLC PAD also trnsmits an X.25 clear confirmation packet back to the PSN, specifying the same line/control unit as was designated in the clear indication packet. When the terminal HDLC PAD subsequently receives the SDLC UA response frame from this line/control unit in response to the DISC command, the start of call setup phase is then entered for that line/control unit after expiration of a timer.

ABNORMAL CONDITIONS

Figure 22:
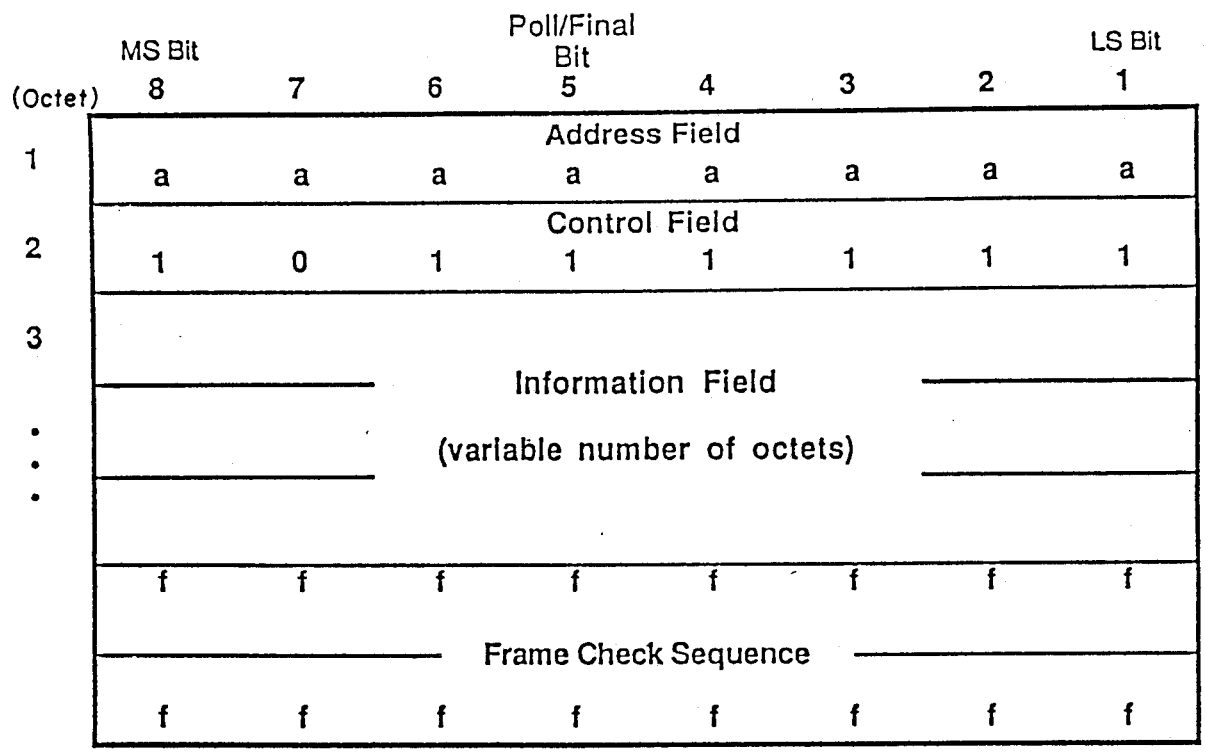
Figure 23:
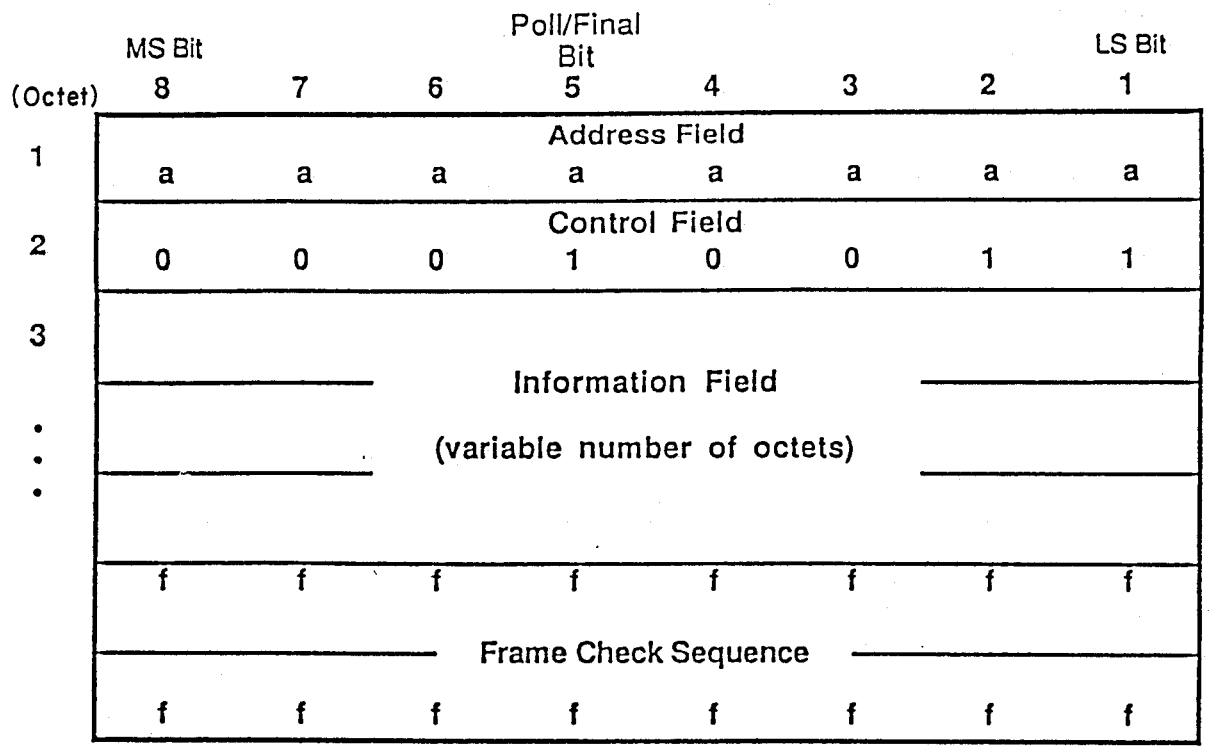
Figure 24:
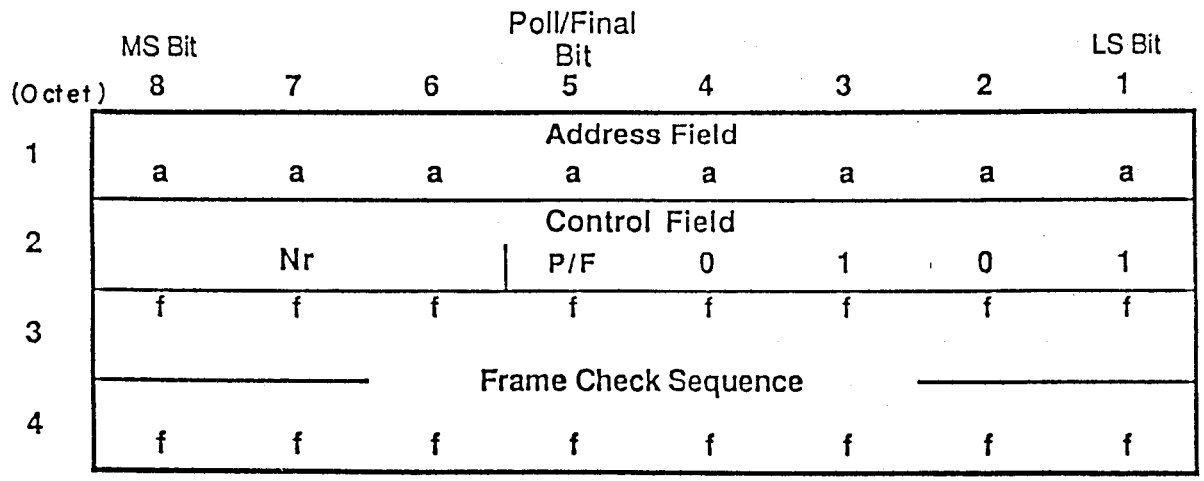

In general, three classes of conditions are outside the normal call set-up, data transfer, and call clearing activities of the HPAD baseline implementation according to the present invention. These classes are (i) non-error conditions, including SDLC TEST frames, SDLC exchange identification (XID) frames (having a general format shown in FIG. 22), and SDLC unnumbered information (UI) frames (having a general format shown in FIG. 23); (ii) temporary/recoverable problems, constituting conditions representing a problem but which are recoverable without loss of connection, including SDLC receive not ready (RNR) frames (FIG. 24), SDLC frame count mismatch, SDLC intermediate polling timeouts, and inactivity timeout timer resetting; and (iii) permanent problems, constituting conditions which result& in or require clearing of a connection. Permanent problems include a number of conditions, among which are the following: unexpected SDLC DM received, call reset to host HPAD (clear option), call reset to terminal HPAD (clear option), call reset to host HPAD (reset option), call reset to terminal HPAD (reset option), unexpected interrupt to host HPAD from PSN, unexpected interrupt to terminal HPAD from PSN, host HPAD receives an invalid SDLC frame, terminal HPAD receives an SDLC frame reject frame (FRMR), terminal HPAD receives an invalid SDLC frame, timeout retries exhausted on SDLC connection, virtual circuit inactivity timer timeout, call request failure detected by PSN, call request failure detected by HPAD, data set signals drop at host, and data set signals drop at terminal.

QLLC PAD

The general strategy for the QLLC PAD of the present invention is very similar to that described above for the general strategy of the HPAD. The principal reason for differences between the two is that the QLLC configurations involve a PAD according to the present invention on only one end of the connection (as was shown in FIGS. 2 and 3), whereas the HPAD configuration employs a PAD according to the invention at both the host end and the terminal end of the connection. Thus, for the QLLC case, the PAD must deal with messages across the PSN having format and content determined by something other than that PAD itself, that is, by a QLLC facility in a remote device. A lesser impact is felt on the handling of the various categories of SDLC frames. Some of the mode changing frames are now forwarded through the network and the data qualified packet format can no longer support a variation to be used for PAD-to-PAD reporting of error conditions.

Although certain presently preferred embodiments of the invention have been described, it will be apparent to those of ordinary skill in the art to which the invention pertains that variations and modifications of the disclosed embodiments may be made without departing from the true spirit and scope of the invention. Accordingly, it is intended that the invention shall be limited only as and to the extent required by the appended claims and the applicable rules of law.

What is claimed is:

1. In a data communications system having layered communication architecture with network services protocols including a link layer and higher level protocols and having IBM or IBM-compatible synchronous data link control (SDLC) devices including a host computer and an end user device desiring to communicate across an X.25 packet switching network of said communications system, the improvement comprising packet assembler/disassembler (PAD) means for supporting X.25 communication across said packet switching network between said SDLC host computer and said SDLC end user device, said PAD means operatively coupled in said communications system between said packet switching network and at least one of said SDLC host computer and said SDLC end user device, each of said SDLC host computer and said SDLC end user device being adapted to generate a plurality of SDLC format frames of data, said plurality of SDLC format frames including (i) unnumbered format frames with link layer functions to manage connection modes in the link layer, (ii) information format frames carrying data having primary use at said higher level protocols, and (iii) supervisory format frames to control the flow of said information format frames, said PAD means including transmitting means responsive to any of a plurality of SDLC format frames of data generated by one of said SDLC host computer and said SDLC end user device for selectively transmitting X.25 data packets, representative of the data carried by said information format frames, across said packet switching network, while restricting at least some of said unnumbered format frames and said supervisory format frames to handling within said PAD means for communication with said one of said SDLC host computer and said SDLC end user device, and generating means responsive to X.25 data packets containing information transmitted across said packet switching network from the other of said SDLC host computer and said SDLC end user device for generating additional SDLC format frames of data representative thereof to communicate with said one of said SDLC host computer and said SDLC end user device.

2. The improvement according to claim 1, wherein said transmitting means includes means for setting up calls between said SDLC host computer and said SDLC end user device to establish an end-to-end connection therebetween across said packet switching network, means for initiating a data transfer phase to transfer information packets via said end-to-end connection, and means for clearing said end-to-end connection.

3. The improvement according to claim 2, wherein said transmitting means further includes means for correcting abnormal conditions in said data communications system.

4. The improvement of claim 2, wherein said PAD means comprises duplicate first and second high level data link control (HDLC) PAD means, said first HDLC PAD means being at an end of said packet switching network operationally associated with said SDLC host computer, and said second HDLC PAD means being at an end of said packet switching network operationally associated with said SDLC end user device.

5. The improvement of claim 4, wherein each of said HDLC PAD means includes said transmitting means and said generating means, and said information format frames being forwarded by the transmitting means of the respective HDLC PAD means substantially intact in X.25 data packets.

6. The improvement of claim 2, wherein said PAD means comprises qualified logical link control (QLLC) PAD means located at only one end of said packet switching network for either operational association with said SDLC host computer or operational association with said SDLC end user device, said QLLC PAD means including both of said transmitting means and said generating means.

* * * * *